(12) United States Patent
Rorato

(10) Patent No.: US 10,650,572 B2
(45) Date of Patent: May 12, 2020

(54) GENERATING A 2D DRAWING REPRESENTING A MECHANICAL PART

(71) Applicant: DASSAULT SYSTEMES, Velizy Villacoublay (FR)

(72) Inventor: Remy Rorato, Velizy Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

(21) Appl. No.: 16/143,063

(22) Filed: Sep. 26, 2018

(65) Prior Publication Data
US 2019/0096120 A1 Mar. 28, 2019

(30) Foreign Application Priority Data

Sep. 26, 2017 (EP) ..................................... 17306268

(51) Int. Cl.
*G06T 19/00* (2011.01)
*G06T 11/20* (2006.01)
*G06F 17/50* (2006.01)
*G06T 17/00* (2006.01)
*G06T 15/10* (2011.01)
(Continued)

(52) U.S. Cl.
CPC ............ *G06T 15/10* (2013.01); *G06T 3/0037* (2013.01); *G06T 15/20* (2013.01); *G06T 17/10* (2013.01); *G06T 17/30* (2013.01); *G06T 2215/06* (2013.01)

(58) Field of Classification Search
CPC ....... G06T 3/0037; G06T 15/10; G06T 17/30; G06T 15/20; G06T 17/10; G06T 2215/06; G06T 19/00; G06T 11/203; G06T 2219/00; G06T 2219/004; G06T 2219/008; G06T 2219/012; G06T 2219/016; G06T 2219/20; G06T 17/00; G06F 17/50; G06F 17/5086; G06F 17/5095

See application file for complete search history.

(56) References Cited

U.S. PATENT DOCUMENTS 5,297,241 A * 3/1994 Hirr, Jr. ................... G06T 17/10
345/419
2006/0089747 A1* 4/2006 Sakai ...................... G06T 19/00
700/182

FOREIGN PATENT DOCUMENTS

EP     2 750 107 A1    7/2014

OTHER PUBLICATIONS

Manfredo P. Do Carmo, "Differential Geometry of Curves and Surfaces"; Instituto De Matematica Pura E Aplicada (IMPA); Rio de Janeiro, Brazil; 511 pages.
(Continued)

*Primary Examiner* — Ke Xiao
*Assistant Examiner* — Andrew Shin
(74) *Attorney, Agent, or Firm* — Oblon, McClelland, Maier & Neustadt, L.L.P.

(57) ABSTRACT

The invention notably relates to a computer-implemented method for generating a 2D drawing representing a mechanical part. The method comprises providing a 3D modeled object which represents a 3D shape of the mechanical part. The method also comprises determining continuous 3D curves which each represent a respective instance of a predetermined set of visual characteristics of reflection lines defined on the 3D shape. The method also comprises projecting the determined continuous 3D curves on a 2D plane. The method provides an improved solution to generate a 2D drawing representing a mechanical part.

14 Claims, 10 Drawing Sheets providing a 3D modeled object which represents 3D shape of a mechanical part — S10 determining continuous 3D curves which each represent a respective instance of a predetermined set of visual characteristics of reflection lines defined on the 3D shape — S20 projecting the continuous 3D curves on a 2D plane — S30

(51) Int. Cl.
*G06T 17/30* (2006.01)
*G06T 15/20* (2011.01)
*G06T 17/10* (2006.01)
*G06T 3/00* (2006.01)

(56) References Cited

OTHER PUBLICATIONS

Holger, Theisel, "Are Isophotes and Reflection Lines the Same?"; Computer Aided Geometric Design; 12 pgs.
Catia Tricks; "Surface Area of a Projection"; https://catiatricks.com/surface-area-of-a-projection/; XP-002777042; 8 pgs.
Extended European Search Report dated Jan. 19, 2018, in Europe Patent Application No. 17306268.8-1230; 10 pgs.

* cited by examiner

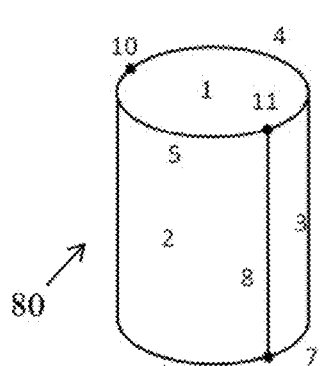
FIG. 8
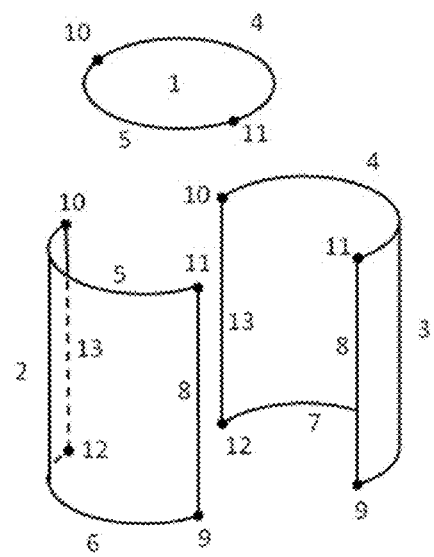
FIG. 9
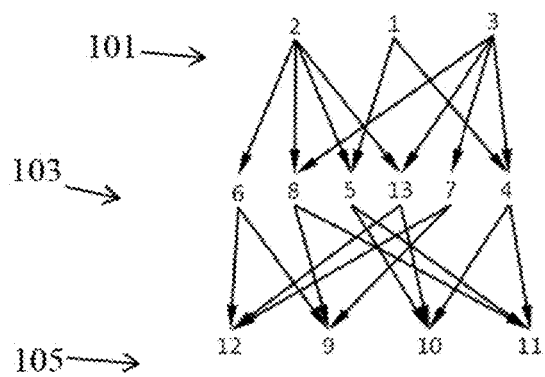
FIG. 10
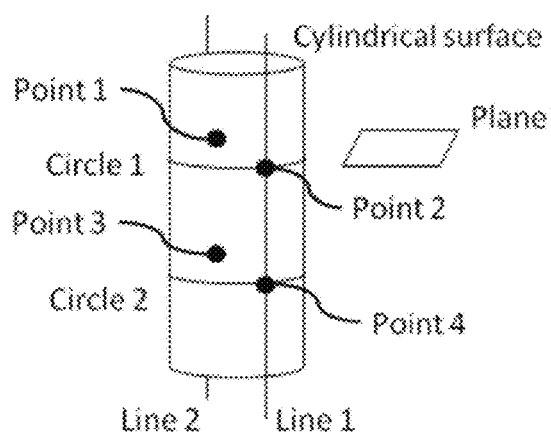
FIG. 12
| | |
|---|---|
| 1 | → Plane |
| 2 | → Cylindrical surface |
| 3 | → Cylindrical surface |
| 4 | → Circle 1 |
| 5 | → Circle 1 |
| 6 | → Circle 2 |
| 7 | → Circle 2 |
| 8 | → Line 1 |
| 9 | → Point 4 |
| 10 | → Point 1 |
| 11 | → Point 2 |
| 12 | → Point 3 |
| 13 | → Line 2 |
FIG. 11

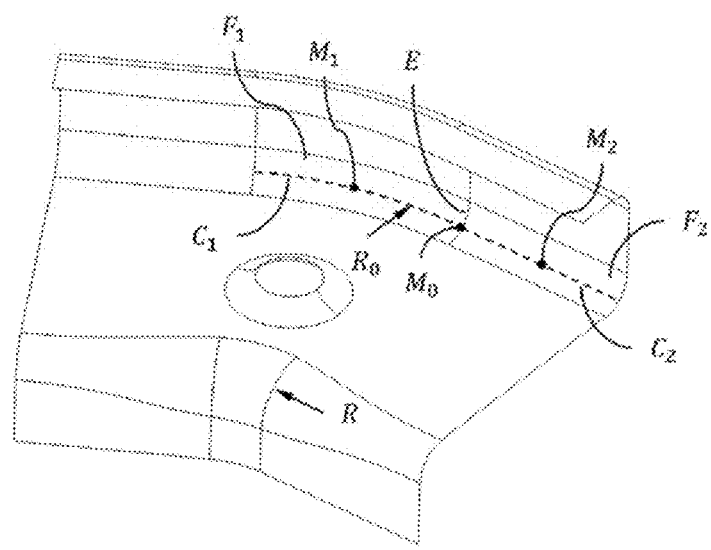
FIG. 31
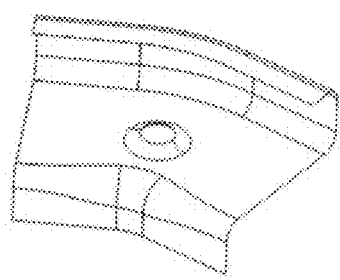 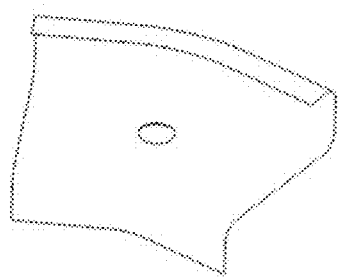 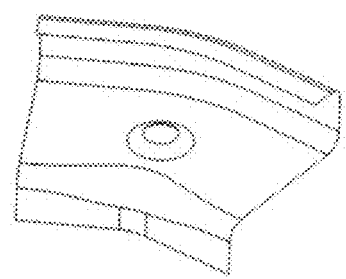
FIG. 32    FIG. 33    FIG. 34

GENERATING A 2D DRAWING REPRESENTING A MECHANICAL PART

CROSS-REFERENCE TO RELATED APPLICATIONS

This application claims priority under 35 U.S.C. § 119 or 365 to European Application No, 17306268.8, filed Sep. 26, 2017. The entire contents of the above application(s) are incorporated herein by reference.

FIELD OF THE INVENTION

The invention relates to the field of computer programs and systems, and more specifically to a method, system and program for generating a 2D drawing representing a mechanical part.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systemes (under the trademarks CATIA, ENOVIA and DENIM) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Such systems may include engineering 2D drawing solutions. A goal of engineering 2D drawing may be to provide the user with a 2D drawing made of lines, arrows, numbers and texts in order to describe the shape of a mechanical part. The syntax of this description is provided by well-known standards (ISO, ANSI, JIS, BS, AA, DIN). The art of engineering drawing is to end with a non-ambiguous and non-redundant description of the mechanical part.

Within this context, there is a need for an improved solution to generate a 2D drawing representing a mechanical part.

SUMMARY OF THE INVENTION

It is therefore provided a computer-implemented method for generating a 2D drawing representing a mechanical part. The method comprises providing a 3D modeled object which represents a 3D shape of the mechanical part, determining continuous 3D curves, and projecting the determined continuous 3D curves on a 2D plane. Such a method allows generating a 2D drawing representing a mechanical part from a 3D modeled object which represents a 3D shape of the mechanical part.

In examples, the continuous 3D curves may each represent a respective instance of a predetermined set of visual characteristics of reflection lines defined on the 3D shape. This allows generating a 2D drawing which represents reflection information, and thus represents and/or allows understanding 3D shape of the mechanical part. In examples, the predetermined set of visual characteristics may include any one or any combination of: an end, a zero-order discontinuity, a tangent discontinuity, a curvature above a predetermined threshold, and/or a boundary of a portion including a curvature above a predetermined threshold.

In examples, the continuous 3D curves may be defined on the 3D shape, and include one or more silhouette curves (e.g. which may each comprise one or more continuous 3D curve pieces, e.g. one or more silhouette curves being piecewise continuous) and/or any one or any combination of the following types of curves with respect to the surface of the 3D shape: singular curves—e.g. including sharp curves such as boundary curves (if the surface is an open surface) and/or (surface) tangent discontinuity curves, and/or including non-sharp singular curves (surface) such as tangent continuity but (surface) curvature discontinuity curves and/or smooth curves i.e. non-sharp curves, e.g. including (surface) curvature continuity curves and/or (surface) curvature discontinuity curves but (surface) tangent continuity which respect a predetermined criterion, related to local curvature variation. The predetermined criterion may for example constitute a requirement that local (surface) curvature variation be relatively high and/or above a predetermined threshold. Local curvature variation may be curvature variation across the curve or in a portion bounded by the curve. This allows generating a 2D drawing which represents and/or allows understanding 3D shape of the mechanical part in a simple manner.

Indeed, in these examples, 3D surface geometry may correspond to light reflection such that:
  a silhouette curve may represent ends or zero-order discontinuities of reflection lines, and
  for portions not belonging to silhouette:
    the boundary curves and/or the tangent discontinuity curves may each represent a zero-order discontinuity of reflection lines,
    the tangent continuity but curvature discontinuity curves may each represent a tangent discontinuity of reflection lines, and/or
    the curvature continuity curves may each represent a curvature of reflection lines above a predetermined threshold corresponding to the predetermined criterion, and/or a boundary of a portion of reflection lines including a curvature above a predetermined threshold corresponding to the predetermined criterion.

The determined continuous 3D curves thus represent reflection information.

In all examples, the 3D modeled object may be a boundary representation (B-Rep) comprising edges. The B-Rep may have been designed by a designer. In these examples, at least part of the continuous 3D curves determined to be projected may be determined among the edges of the B-Rep. This allows a simple determination of 3D curves, for example simply consisting in a selection of edges of the B-Rep. Said at least part of the continuous 3D curves may comprise all the determined curves but the silhouette curve(s), and/or said at least part of the continuous 3D curves may comprise all the determined curves 3D curves which represent a zero-order discontinuity of reflection lines, a tangent discontinuity of reflection lines, a curvature of reflection lines above the predetermined threshold and/or the boundaries of a portion of reflections lines including a curvature above the predetermined threshold. The designer may have designed the B-Rep, including adding edges to represent such visual characteristics of reflection lines, e.g. at least one B-Rep edge per instance of any of such visual characteristics. This may have allowed an efficient and natural designing for the designer. In such cases, the method may take advantage of this fact to efficiently perform the determining of the continuous 3D curves, by making use of available edges representing reflection information.

In examples, not all the edges of the B-Rep are selected. This allows reducing the risk of superfluous 2D lines in the generated 2D drawing. In examples, all sharp edges e.g. including all boundary edges (if the B-Rep is an open skin) and all tangent discontinuity edges and optionally all other singular but non-sharp edges such as all tangent continuity but curvature discontinuity edges may be selected. In such and other examples, non-sharp (i.e. smooth) edges may also be selected (i.e. among curvature continuity edges and optionally among curvature discontinuity but tangent continuity edges), but not all of them such that not all edges of the B-Rep are selected. For example, the smooth edges which are selected may be limited to those that respect the predetermined criterion related to local curvature variation. In other words, smooth edges not respecting the predetermined criterion are not selected. This allows simply and efficiently generating a 2D drawing forming a non-ambiguous and non-redundant description of the mechanical part, with no or few superfluous 2D lines in the result.

The method may comprise one or more of the following
- the determining of continuous 3D curves comprises determining curvature continuity curves which define the boundary between two adjacent faces across which the variation of a curvature is above a predetermined threshold;
- the curvature of a respective face relative to a respective boundary is a function of the curvature at one or more points of a curve of the respective face intersecting the respective boundary;
- the curve of the respective face intersecting the respective boundary intersects the respective boundary orthogonally and/or at a middle point of the respective boundary;
- the respective face is a portion a parametric surface and the curve of the respective face intersecting the respective boundary is a p-curve of the parametric surface;
- the one or points of the curve of the respective face intersecting the respective boundary include a point at which the curve of the respective face intersecting the respective boundary intersects the respective boundary and/or a middle point of the curve;
- the predetermined threshold corresponds to the maximum radius used in a process of manufacturing the mechanical part;
- the process of manufacturing the mechanical part is a stamping process and the maximum radius is a value above 3.0 mm and/or below 50 mm, for example of the order of 30 mm;
- the process of manufacturing the mechanical part is a casting process and the maximum radius is a value above 1 mm and/or below 10 mm, for example of the order of 3 mm; and/or
- the mechanical part is a sheet metal part.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

Embodiments of the invention will now be described, by way of non-limiting example, and in reference to the accompanying drawings, where:
FIGS. 8-12 illustrate the B-Rep format;
FIGS. 19-34 illustrate an example of the method.

DETAILED DESCRIPTION OF THE INVENTION

Figure 1:
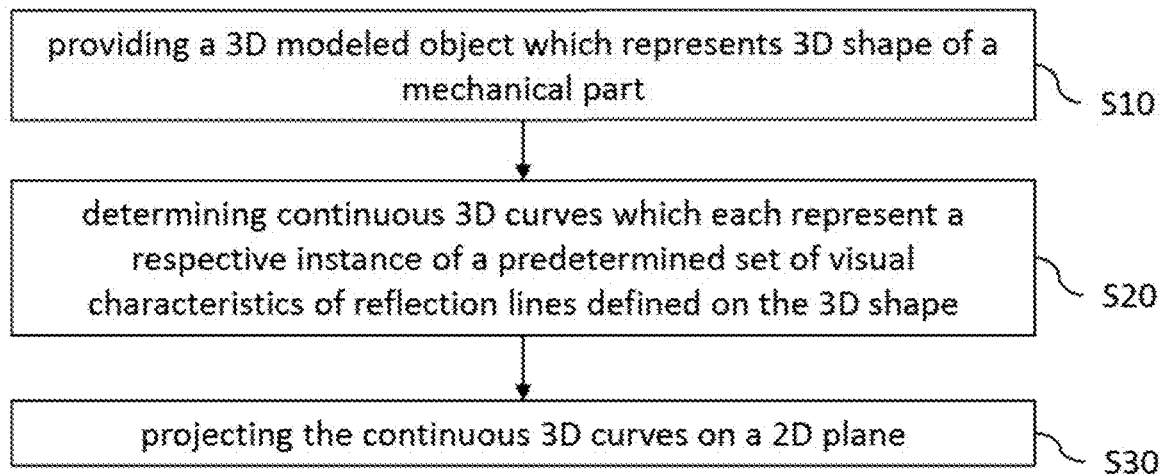
FIG. 1 shows a flowchart of an example of the method.

With reference to the flowchart of FIG. 1, it is proposed a computer-implemented method for generating a two-dimensional (2D) drawing representing a mechanical part. The method comprises providing S10 a three-dimensional (3D) modeled object. The 3D modeled object represents a 3D shape of the mechanical part, for example its outer surface (or skin) or its occupancy volume. The method also comprises determining S20 continuous 3D curves. Each continuous 3D curve represents a respective instance of a predetermined set of visual characteristics of reflection lines, which reflection lines are defined on the 3D shape. In other words, each continuous 3D curve represents a respective occurrence of one of the predetermined set. The continuous 3D curves are thus located on the 3D shape, e.g. on the outer surface of the mechanical part. The method also comprises projecting S30 the continuous 3D curves determined at S20 on a 2D plane. The projecting S30 may be started after the determining S20 is completely over, or alternatively the projecting S30 and the determining S20 may be interlaced. Such a method provides an improved solution to generate a 2D drawing representing a mechanical part.

Notably, the method generates a 2D drawing from a 3D modeled object representing the mechanical part. In other words, the method bridges 3D design with engineering 2D drawing. This is thanks to a projection on a 2D plane of continuous 3D curves corresponding to the 3D modeled object. The projection of the continuous 3D curves results in 2D lines which may form at least part of the 2D drawing. The generated 2D lines indeed form a 2D view of the mechanical part. The method thereby falls within the field of 3D CAD and allows outputting a 2D drawing after a 3D modeled object of the mechanical part is provided, for example after it has been designed e.g. using a 3D CAD software. Now, because each continuous 3D curve represents a visual characteristic of reflection lines, the 2D lines also represent such visual characteristics of reflection lines. The 2D drawing generated by the method thereby provides reflection information, thus providing visual information on the 3D shape of the mechanical part, e.g. representing 3D shape of the mechanical part in a 2D view, e.g. even without any shading, texturing, and/or photorealistic image.

Figure 2:
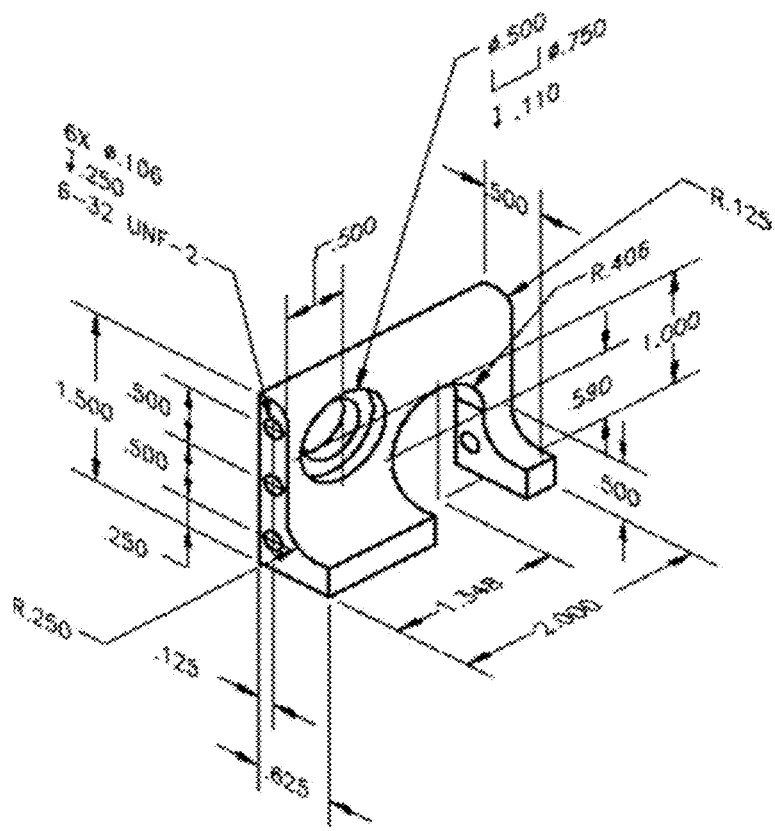
FIG. 2 shows an example of 2D drawing representing a mechanical part.

The method may comprise after or in parallel to the projection S30 addition of elements to the 2D drawing (other than the 2D lines representing characteristics of reflection lines). Such additional elements may include standard features, such as dimensions, border lines, title block, arrows, numbers and/or texts. The 2D drawing may be such that it does not comprise any advanced graphic feature, such as shading, texturing, or photorealistic image. The 2D drawing may consist of only black lines on a white background. The 2D drawing may meet any one or any combination of the following well-known standards: ISO, ANSI, AS, BS, AA, and/or DIN. FIG. 2 shows an example of such a 2D drawing of a mechanical part, which may be outputted by the method.

The projection S30 may be performed according to any perspective. The perspective comprises information providing location of the 2D plane and viewpoint (i.e. observer's position). The perspective may for example be a conical perspective or a cylindrical perspective. The 2D plane may be apart from the 3D modeled object, i.e. with no intersection between the 3D shape and the 2D plane. The projection S30 may for example correspond to any one of a: left, right, top, bottom, or axonometric 2D view, e.g. with respect to a reference frame associated to the 3D modeled object. The method may be repeated with different projections S30 so as to result in a multi-view 2D drawing of the mechanical part. The multi-view 2D drawing may represent the geometry of the mechanical part according to a predetermined set of viewpoints.

The method may comprise removing geometry of the 3D modeled object hidden in the perspective. The removal may be performed before, at the time of or after the projecting S30, e.g. and/or before, at the time of or after the determining S20. The determining S20 may be performed within visible geometry only, that is within reflection lines visible in the perspective. All continuous 3D curves determining at S20 may in such a case be visible ones. The input of the removal may be the 3D modeled object and the perspective definition (i.e. including observer's position). The purpose of the removal may include eliminating geometry that is hidden to the observer.

Figure 3:
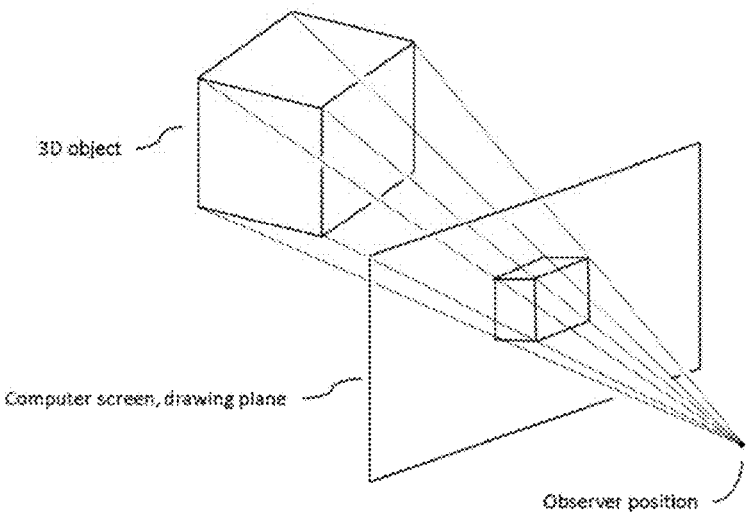
FIGS. 3-4 show examples of projection.
Figure 4:
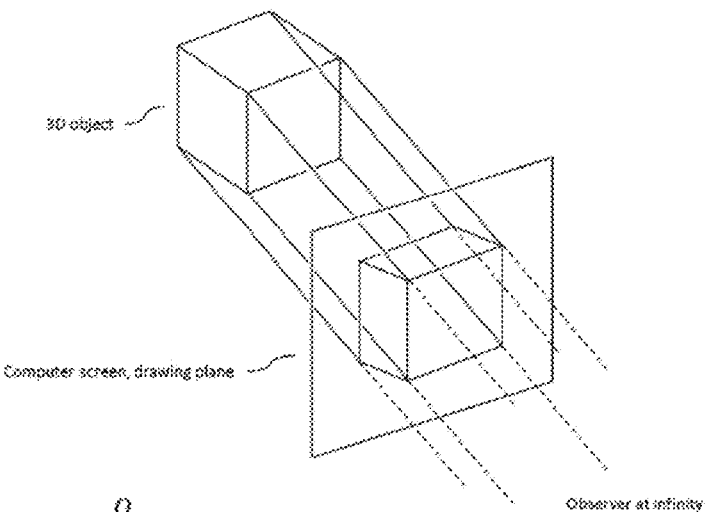

FIG. 3 illustrates a conical perspective of a 3D modeled object. FIG. 4 illustrates a cylindrical perspective of 3D modeled object.

The determining S20 is now discussed.

A reflection line defined on a 3D shape of a mechanical part is a line defined on the outer surface of the mechanical part and which represents, relative to a viewpoint, the reflect of a light source forming a straight line. The light source line is a line of positions from which light is emitted and which may be finite or infinite.

Figure 5:
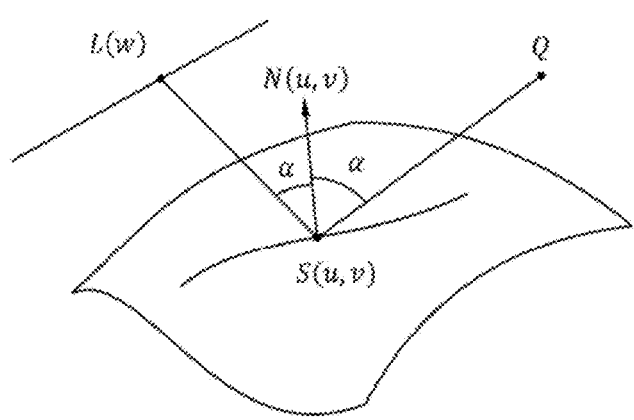
FIG. 5 shows illustrates the reflection line concept.

Referring to FIG. 5, the following provides a formal definition in the case of a viewpoint defined as an observer's finite position, and which may be extended in a straightforward manner to the case of an observer infinite position. In a 3D space, consider a parameterized surface $(u,v) \mapsto S(u, v)$, a line $w \mapsto L(w)$ and a point Q. The principle is to consider straight line L as a light source and to compute its reflect on surface S viewed from an observer at position Q. This reflect of light source is named the reflection line. Equations are as follows. Note $N(u,v)$ the normal vector of surface S. The Descartes optical principle states that, firstly, the cosine of angle between vectors L-S and N is the same as the cosine of angle between vectors Q-S and N and, secondly, that the three vectors L-S, Q-S and N are coplanar, as illustrated in FIG. 5. As a result, the reflect line is the curve of $w \mapsto S(u(w),v(w))$ where mappings $w \mapsto u(w)$ and $w \mapsto v(w)$ are implicitly defined by the two equations:

$$\left\langle \frac{L(w) - S(u, v)}{\|L(w) - S(u, v)\|}, N(u, v) \right\rangle = \left\langle \frac{Q - S(u, v)}{\|Q - S(u, v)\|}, N(u, v) \right\rangle$$
$$\det(L(w) - S(u, v), Q - S(u, v), N(u, v)) = 0$$

The set of reflection lines considered at S20 may comprise or consist of any set of reflection lines defined on the 3D shape. The set of reflection lines may for example comprise or consist of a set of reflection lines visible in the perspective according to which projection S30 is performed. Said set of reflection lines visible in said perspective may comprise or consist of part or all reflection lines defined relative to the perspective's viewpoint and corresponding to infinite light source lines.

The continuous 3D curves determined at S20 represent visual characteristics of reflection lines. Thus, each point of a respective continuous 3D curve represents, for one or more respective reflection lines (e.g. all reflection lines that pass by the point), occurrence of the visual characteristic instance represented by the respective continuous 3D curve. The 3D modeled object represents a 3D shape of a mechanical part, and reflection lines present corresponding visual characteristics e.g. according to geometrical specificities of the 3D shape. The set of all reflection lines forms a network of lines defined all over the 3D shape. Due to material continuity, neighboring reflection lines of the network tend to present the same visual characteristics at neighboring locations. This is because reflection is a physical and material-wise continuous phenomenon. Thereby, each visual characteristic instance across the reflections lines of the network presenting said instance corresponds to a continuous 3D curve defined on the 3D shape. Now, the determining S20 need not necessarily determine reflection lines, as long as the correct continuous 3D curves are provided to the projecting S30, in the examples discussed later, the method actually does not determine any reflection line, but merely perform geometrical computations to determine S20 directly the continuous 3D curves.

A visual characteristic of a reflection line is any position of the reflection line visually identifiable, i.e. a visual singularity point of the reflection line. When the reflection lines of the network comprises such visual characteristics, said visual characteristics form 3D continuous curves visually identifiable. The method determines S20 said 3D continuous curves to project S30 them, making the 2D drawing representative of 3D shape.

The predetermined set of visual characteristics may for example comprise or consist of any one or any combination (e.g. including at least the end characteristic and optionally the zero-order discontinuity characteristic, and yet optionally the tangent discontinuity characteristic) of the following visual characteristics: an end (i.e. an extremity point of reflection lines), a zero-order discontinuity also more simply referred as merely "discontinuity" (i.e. a pair of positions of the reflection line belonging to corresponding extremities of two disjoint pieces of the reflection line, e.g. a reflection line possibly being only piece-wise continuous, e.g. for example if the reflection line crosses a sharp crease), a tangent discontinuity (i.e. a position of the reflection line where the reflection line is continuous but not tangent continuous), a curvature above a first predetermined threshold (i.e. a position of the reflection line where the reflection line is curvature continuous and the curvature of the reflection line is above said first predetermined threshold), and/or a boundary of a portion including a curvature above a second predetermined threshold (i.e. one of a pair of positions of the reflection line which bound a portion of the reflection line which comprises at least one position where the reflection line is curvature continuous and curvature of the reflection line is above said second predetermined threshold, e.g. the first and second predetermined threshold being different or the same). Such visual characteristics are particularly useful to translate in 2D for comprehension of the 3D shape of the mechanical part. In examples, the determining S20 is constrained in that all the determined continuous 3D curves represent one instance of such predetermined set. In other words, no other characteristics are represented in the determined curves, such that the final 2D drawing does not comprise superfluous 2D lines.

An end of a reflection line may correspond to the silhouette of the 3D shape according to the viewpoint. The determined instances of visual characteristics may comprise ends of reflection lines and other instances of visual characteristics. For example, the method may determine at S20 the silhouette of the 3D shape according to the perspective (e.g. by computation based on the perspective) and project it at S30. The silhouette of the 3D shape may correspond to one or more continuous silhouette 3D curves or one or more piece-wise continuous 3D silhouette curves which each comprises several continuous 3D curves. In this example, the method may further determine other continuous 3D curves representing instances of visual characteristics other than silhouette. These other continuous 3D curves may for example be determined among B-Rep edges. A silhouette curve may comprise at least portions distinct from any B-Rep edge.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined. Notably, the determining S20 and the projecting S30 may be performed fully-automatically, e.g. after general settings are entered by the user.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systemes under the trademark DELMIA®.

By CAE solution, it is additionally meant any solution, software of hardware, adapted for the analysis of the physical behavior of a modeled object. A well-known and widely used CAE technique is the Finite Element Method (FEM) which typically involves a division of a modeled objet into elements which physical behaviors can be computed and simulated through equations. Such CAE solutions are provided by Dassault Systemes under the trademark SIMULIA®. Another growing CAE technique involves the modeling and analysis of complex systems composed a plurality components from different fields of physics without CAD geometry data. CAE solutions allow the simulation and thus the optimization, the improvement and the validation of products to manufacture. Such CAE solutions are provided by Dassault Systemes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product primarily engineers but also including project managers, finance people, sales people and buyers. A PDMI solution is generally based on a product-oriented database. It allows the actors to share consistent data on their products and therefore prevents actors from using divergent data. Such PDM solutions are provided by Dassault Systemes under the trademark ENOVIA®.

Figure 6:
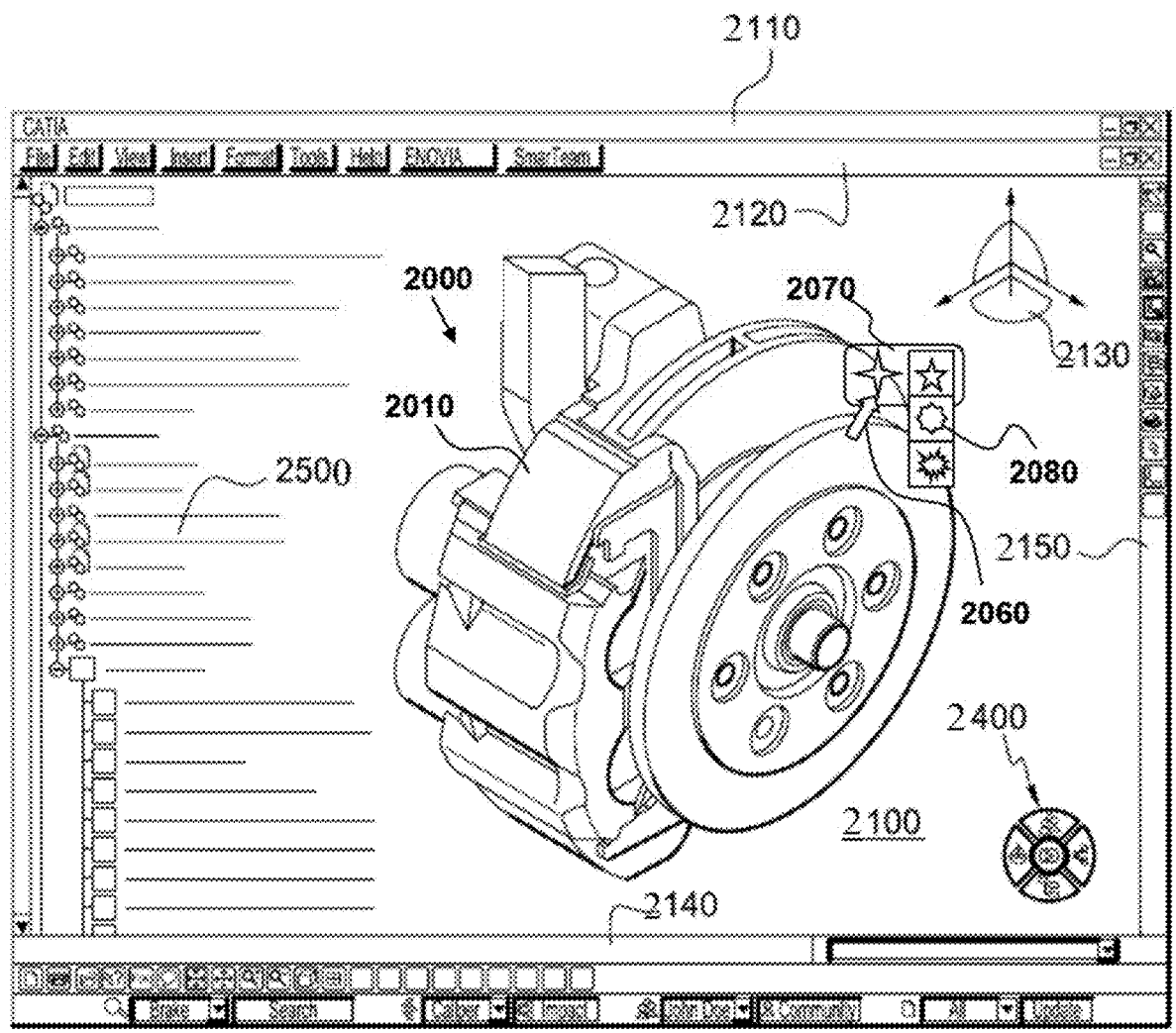
FIG. 6 shows an example of a graphical user interface of the system.

FIG. 6 shows an example of the GUI of the system, wherein the system is a CAD system. The GUI of the example may be used to design the 3D modeled object and/or provide it at S10.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of the figure, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 7:
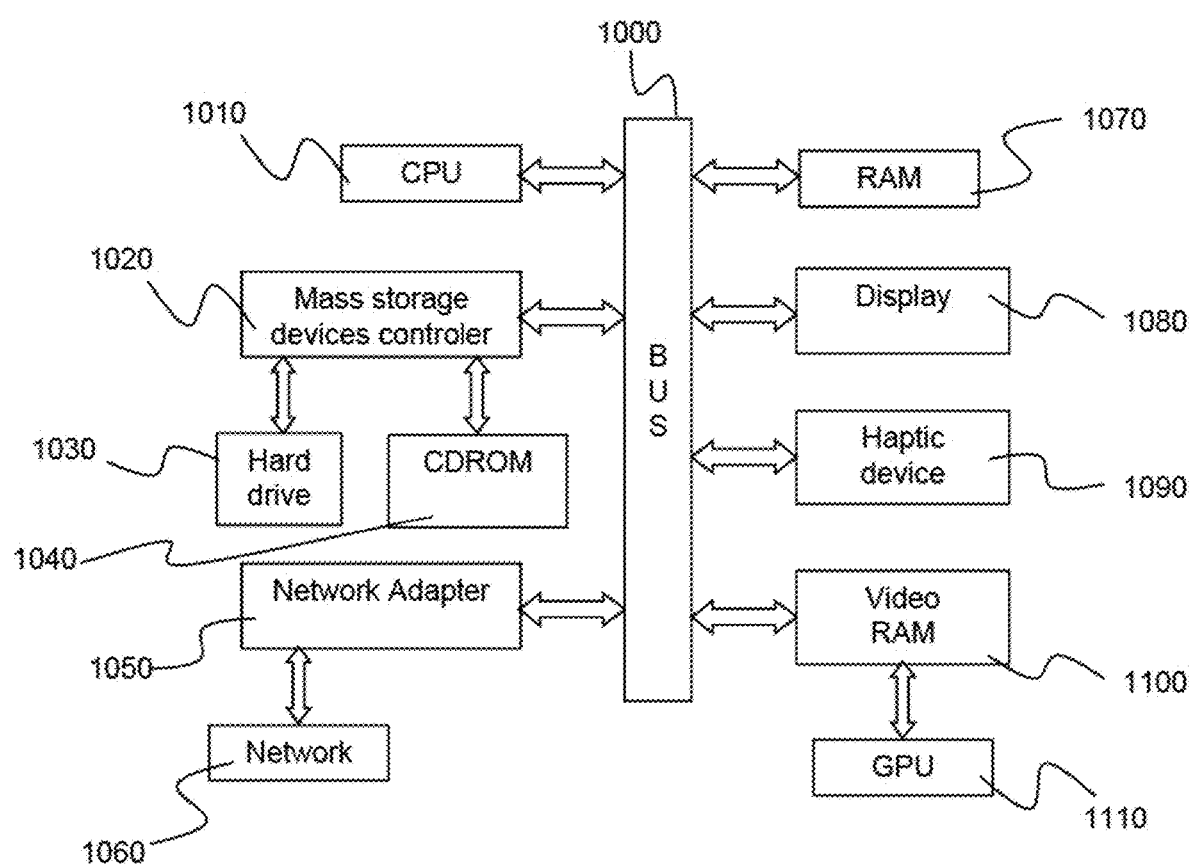
FIG. 7 shows an example of the system.

FIG. 7 shows an example of the system, wherein the system is a client computer system, e.g., a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The method may be included in a manufacturing process, which may comprise, after performing the method, producing a physical product corresponding to the mechanical part. In any case, the modeled object may represent a manufacturing object. The modeled object may thus be a modeled solid (i.e. a modeled object that represents a solid). The manufacturing object may be a product, such as a part, or an assembly of parts. Because the method improves the design of the modeled object, the method also improves the manufacturing of a product and thus increases productivity of the manufacturing process.

The 3D modeled object may be provided at S10 as a B-Rep comprising edges. This format is widely used by designers to represent 3D shapes of mechanical parts. Furthermore, designers often design a B-Rep using edges in order to represent geometry that appears to correspond to instances of visual characteristics of reflection lines (except for ends of reflection lines corresponding to silhouette). Thus, the determining S20 may efficiently be performed among the edges of the B-Rep, at least partly (for example for all other continuous 3D curves than those corresponding to silhouette).

As widely known, a B-rep model includes topological entities and geometrical entities. Topological entities are: face, edge, and vertex. Geometrical entities are 3D objects: surface, plane, curve, line, point. By definition, a face is a bounded portion of a surface, named the supporting surface. An edge is a bounded portion of a curve, named the supporting curve. A vertex is a point in 3D space. They are related to each other's as follows. The bounded portion of a curve is defined by two points (the vertices) lying on the curve. The bounded portion of a surface is defined by its boundary, this boundary being a set of edges lying on the surface. Edges of the face's boundary are connected together by sharing vertices. Faces are connected together by sharing edges. By definition, two faces are adjacent if they share an edge. Similarly, two edges are adjacent if they share a vertex. Such information is enough input data for the method.

FIGS. 8 and 9 illustrate the B-rep model of a cylindrical slot 80 that may be provided at S12 and that is made of three faces numbered 1, 2 and 3 on the figures: top planar face 1 and two lateral cylindrical faces 2 and 3. FIG. 8 shows a perspective view of slot 80. FIG. 9 shows the exploded view of all faces. Duplicated numbers illustrate edges and vertices sharing. Face 1 is a bounded portion of a plane. Boundary of face 1 includes edges 4 and 5, each of them being bounded by vertices 10 and 11. They both have the same supporting circle. Face 2 is bounded by edges 6, 8, 5 and 13 all lying on an infinite cylindrical surface (i.e. the supporting surface of face 2). Faces 1 and 2 are adjacent because they share edge 5. Faces 2 and 3 are adjacent because they share edges 8 and 13. Faces 1 and 3 are adjacent because they share edge 4.

Figure 20:
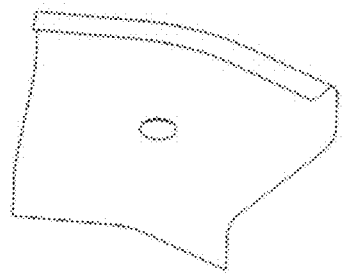
Figure 21:
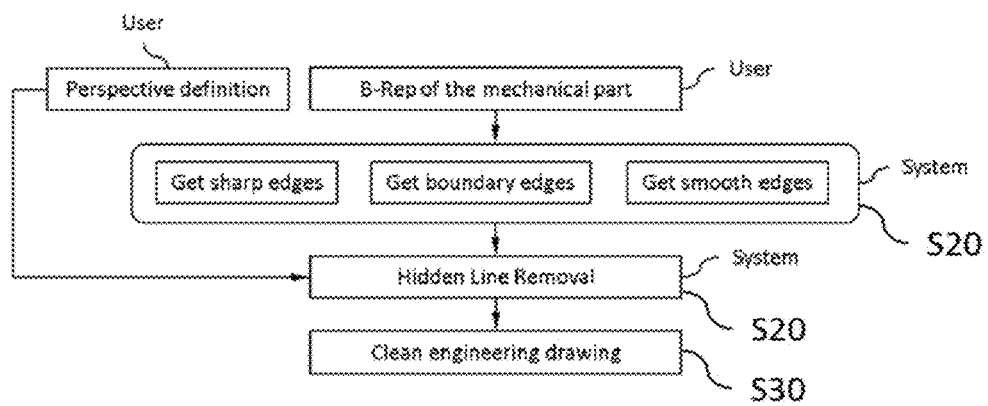

FIG. 10 illustrates the "is bounded by" topological relationship of the B-rep model of slot 80. Nodes of higher layer 101 are faces, nodes of intermediate layer 103 are edges and nodes of lower layer 105 are vertices. FIGS. 11 and 12 illustrate the relationship between topological entities (faces, edges, vertices) and the supporting geometries (infinite cylinder, infinite plane, infinite line, points). In the CAD system, the B-rep model gathers in an appropriate data structure the "is bounded by" relationship and the relationship between topological entities and supporting geometries, and mathematical descriptions of supporting geometries. In other words, the data structures shown on FIGS. 20 and 21 are part of the topological data of this example, which comprise links to geometrical entities of the geometrical data this is FIG. 11) and links between topological entities (this is FIG. 10).

The B-Rep model represents a closed skin if and only if all edges are shared by exactly two faces. In a CAD system, a thick part may be represented by a solid, which is a closed skin. Conversely, it represents an open skin if at least one edge is the boundary edge of only one face, meaning that it is not shared by another face. Such an edge is a named boundary edge. An edge shared by two faces is named an internal edge. In a CAD system, a thin part, like a sheet metal part, may be represented by an open skin, the thickness value being an associated numerical parameter.

The determining S20 may be performed among the edges of the B-Rep in any way. For example, the determining S20 may comprise applying one or more selection criteria, for example testing whether each of at least a part of the edges of the B-Rep meet the one or more selection criteria, and outputting edges for which the test is positive. The one or more selection criteria may relate to surface curvature at the tested edge.

The one or more selection criteria may include a first category of one or more selection criteria. The first category may include being a curvature and tangent discontinuity curve (i.e. the B-Rep surface is curvature discontinuous and tangent discontinuous at the edge, e.g. because the edge is a boundary of the B-Rep which is an open surface or the edge corresponds to a sharp crease of the B-Rep) and optionally being a curvature discontinuity and tangent continuity curve (i.e. the B-Rep surface is tangent continuous but curvature discontinuous at the edge), for example being an at least curvature discontinuity curve. The first category may be implemented in any way. For example, the B-Rep format provided at S10 already comprises for edges meeting the first category information indicative of that, such as information indicative that the edge is a "sharp" edge e.g. via a "sharp edge" flag or a "boundary edge". The first category allows detecting B-Rep edges corresponding to surface geometrical singularities. Such geometrical singularities are visually observable, such that representing them in the final 2D drawing is relevant.

The 3D modeled object represents the geometry of a product to be manufactured in the real world subsequent to the completion of its virtual design with for instance a CAD software solution or CAD system, that is a mechanical part (which encompasses assemblies of parts, as an assembly of parts may be seen as a mechanical part itself, or the method may be applied independently to each part of the assembly, or more generally any rigid body assembly e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object of the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion is equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electromechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

The mechanical part may be such that the B-Rep features relatively many sharp edges. The mechanical part may for example be a part obtained through a turning, grooving, drilling and/or milling manufacturing process. In such a case, the determining S20 may consist in computing the silhouette and selecting all sharp edges (e.g. including if any boundary edges) and no other edges of the B-Rep. FIG. 2 represents an example of such a part and shows that the result in such a case allows understanding the 3D shape of the part. This is because functional details such as hole, groove, pocket, are localized by sharp edges e.g. resulting from material removal. Alternatively, the determining S20 may consist in computing the silhouette and selecting all edges of the B-Rep. The generated 2D drawing remains non-superfluous in 2D lines, because the B-Rep of the contemplated mechanical part may comprise few smooth edges that are going to be superfluous after projection S30 (i.e. smooth edges being B-Rep surface curvature continuity edges, and optionally tangent continuity edges).

Figure 13:
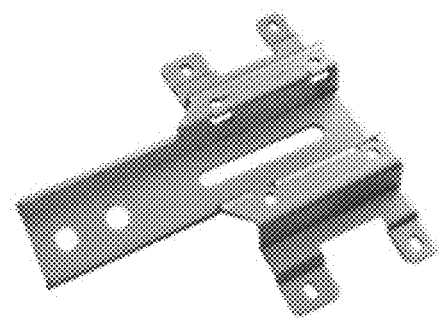
FIGS. 13-18 illustrate mechanical parts.
Figure 14:
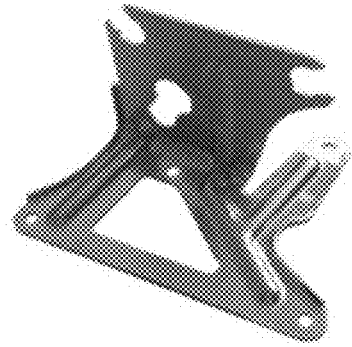
Figure 15:
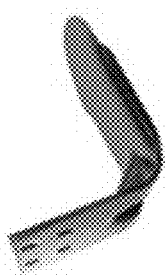
Figure 16:
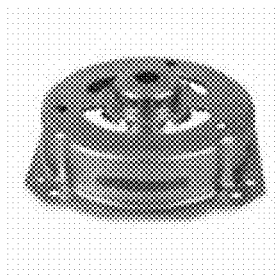
Figure 17:
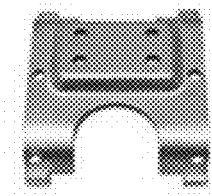
Figure 18:
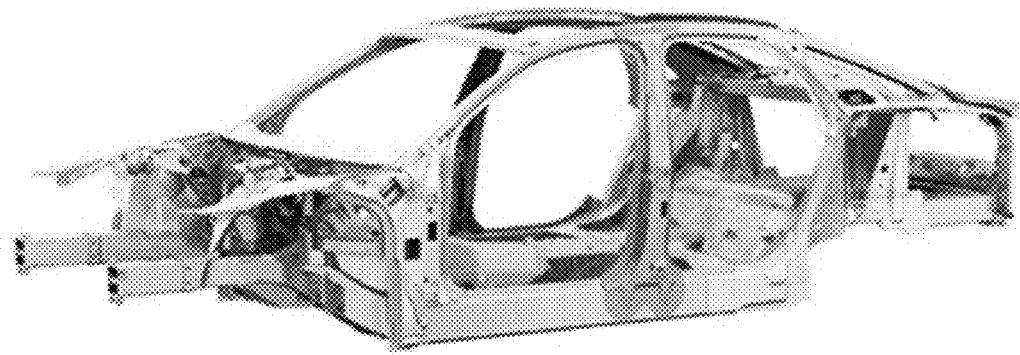

The mechanical part may however alternatively be a sheet metal part, and/or corresponding to a manufacturing process which is a stamping and/or casting process. The situation with stamping sheet metal parts may be different from the one of FIG. 2. They may not naturally feature sharp edges neighboring functional details e.g. because they are obtained by material deformation as opposed to material removal. FIGS. 13-18 illustrate this aspect. FIGS. 13-14 notably illustrate typical sheet metal parts. FIGS. 15-17 illustrate typical metal stamping parts for automotive industry. FIG. 18 figure illustrates a typical body in white assembly of parts.

Figure 19:
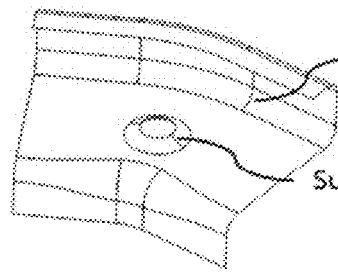

Drawing sharp edges (including boundary edges if any) of the B-Rep and silhouette curves only may not allow a correct interpretation of sheet metal 3D shapes. Conversely, having all smooth edges of the B-Rep displayed may result in many of them being unnecessary. Superfluous smooth edges may result from topological choices of the CAD system as opposed to functional motivation. FIG. 19 illustrates projection of all edges of a sheet metal part. The 3D shape is understandable, but many smooth edges are superfluous. FIG. 20 illustrates the same part with boundary edges and silhouette curves only, making the variable radius surface imperceptible. Clearly, drawing only silhouette curves and sharp edges (including boundary edges if any) of a stamping sheet metal part does not help to understand its actual shape. Conversely, drawing all edges of the B-Rep representing the part is better, but provides many superfluous edges. The consequence for the user is a huge time spent to erase by hand useless edges until the drawing is correct not too many edges and the 3D shape can be understood. This cleaning time is loss in productivity.

The method may thus in an example determine at S20 smooth edges and only those smooth edges that help understanding the shape of the part. Displaying these edges, together with silhouette curves and sharp edges (including boundary edges if any), provides a drawing that does not require any further cleaning and that makes the shape of the part understandable. As a result, no hand cleaning is needed when the drawing is computed by using the method. Saved time is productivity improvement. Additional calculation performed by the method does not increase the overall time for the CAD system to provide the whole drawing. This makes the implementation transparent from the computing time point of view. In addition, computing a correct drawing at first shot allows associativity. This means that modifying the input part and updating yields a new version of the same drawing. This way, downstream applications reusing the drawing can be updated in turn through an automatic process. FIG. 21 shows a flowchart of such an example of the method. The determining S20 of the example may be performed solely based on surface curvature consideration.

An example of the method where the 3D modeled object provided at S10 is a B-Rep is now discussed.

In the example, the continuous 3D curves determined at S20 and projected at S30 are the following and only the following curves:
  i. all continuous 3D curves corresponding to the silhouette of the 3D modeled object according to the perspective of the projection S30;
  ii. all sharp (or non-smooth) edges of the B-Rep (if any) not already determined among category i, such as all boundary edges of the B-Rep (if any) and all crease edges of the B-Rep (if any);
  iii. optionally all tangent continuity but curvature discontinuity edges of the B-Rep (if any) not already determined among category i; and
  iv. all visible smooth edges of the B-Rep (if any) not already determined among category i (and optionally among category iii), wherein smooth edges are considered "visible" when they respect a criterion related to local curvature variation.

In the example, for category iv, the determining S20 may comprise determining smooth edges which define the boundary between two adjacent faces across which the variation of a curvature is above a predetermined threshold. This allows grasping visible smooth edges, as will be described later.

In the example, the curvature of a respective face relative to such a respective boundary smooth edge may be a function of the curvature at one or more points of a curve of the respective face intersecting the respective boundary smooth edge. This allows an efficient determining S20, as will be described later. The curve of the respective face intersecting the respective boundary may intersect the respective boundary smooth edge orthogonally and/or at a middle point of the respective boundary smooth edge. Alternatively or additionally, the one or points of the curve of the respective face intersecting the respective boundary smooth edge (and of which the curvature of a respective face relative to such a respective boundary smooth edge is a function) may include a point at which the curve of the respective face intersecting the respective boundary intersects the respective boundary smooth edge and/or a middle point of the curve. This provides an accurate result.

In the example, faces of the B-Rep may be processed as portions of parametric surfaces, and curves thereon may be processed as p-curves (in terms of processed data structures). This allows efficiency in the computation.

An example implementation of the determining S20 in line with the example is now discussed.

Silhouette Curve, Sharp Edge, Smooth Edge

A smooth edge is in the example implementation an internal edge with two tangent adjacent faces. A sharp edge is a boundary edge or an internal edge with two non-tangent adjacent faces. A silhouette point is where the sign of the scalar product between the view direction D and the B-Rep normal vector changes. The formal definition is as follows. Note N(P) the normal vector of the B-Rep at point P. Then, a point X of the B-Rep is a silhouette point if for arbitrary small $\varepsilon>0$ there exist two points Y and Z of the B-Rep such that $\|X-Y\|\leq\varepsilon$, $\|X-Z\|\leq\varepsilon$, $\langle N(Y),D\rangle>0$ and $\langle N(Z),D\rangle<0$. This definition includes silhouette points located on sharp edges, where the normal vector is not defined.

Figure 22:
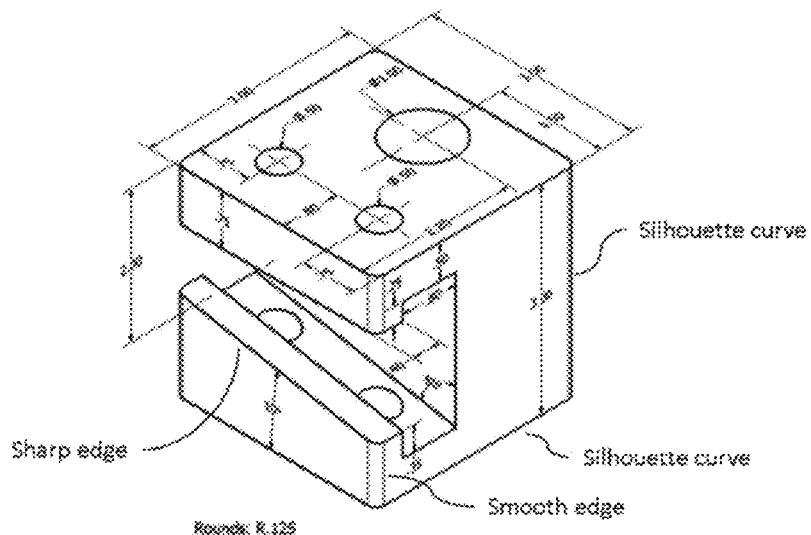
Figure 23:
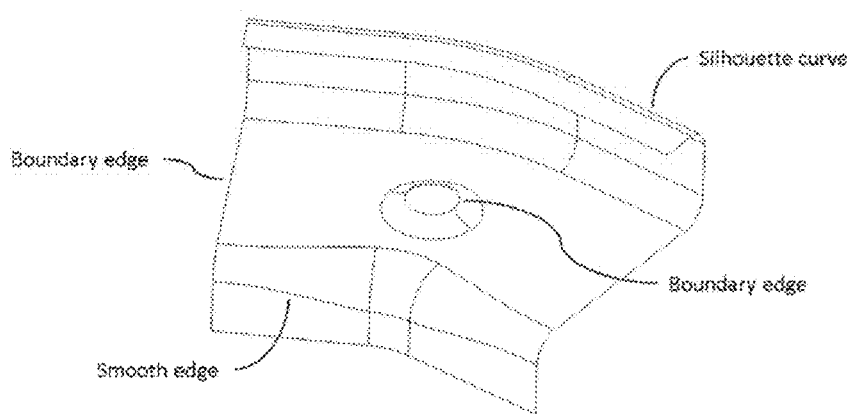

The silhouette curve is the curve made of all silhouette points. FIGS. 22-23 illustrate each situation.

Smoothness Matching of a Shared Edge

Consider an edge E shared by its two adjacent faces $F_1$ and $F_2$. Three types of matching smoothness are relevant in the computer aided design context tangent discontinuous, tangent continuous and curvature continuous. The matching smoothness can be analyzed by the designer using reflection lines. This process provides a visual and intuitive tool which simulates a physical reflection phenomenon.

Figure 24:
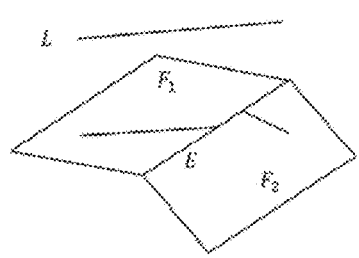
Figure 25:
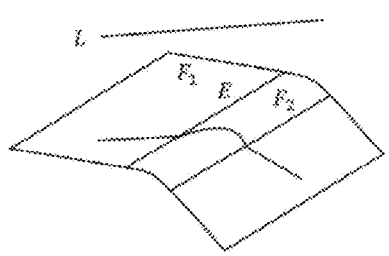
Figure 26:
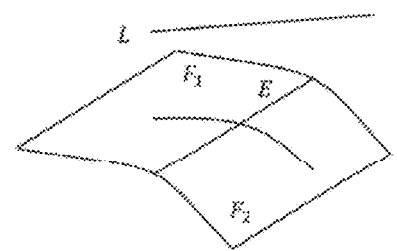

The reflection line is one time less smooth than the surface. This means that where the matching is continuous but not tangent continuous, the reflection line is not continuous (FIG. 24), where the matching is tangent continuous but not curvature continuous (FIG. 25), the reflection line is not tangent continuous (it features a sharp point) and where the matching is curvature continuous (FIG. 26), the reflection line is tangent continuous.

High Curvature Variation

Another type of connecting geometry is relevant in the example implementation. The determining S20 may determine directly the silhouette and all sharp edges, thereby grasping reflection lines' visual characteristics represented on FIG. 24 and FIG. 25 and allowing their projection at S30. Now, smooth edges (corresponding to FIG. 26) may sometimes be relevant to also project at S30. This is when they are said to be "visible". The determining S20 may detect such visibility as follows.

Figure 27:
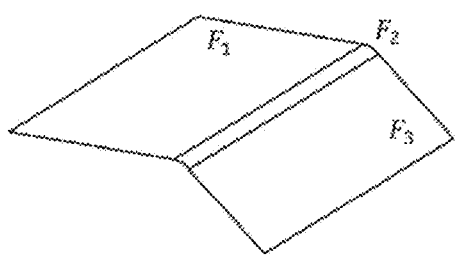
Figure 28:
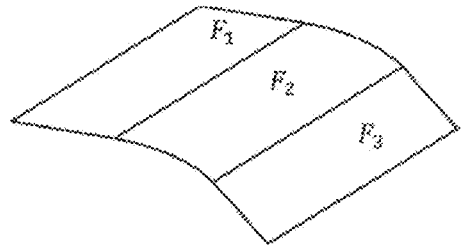

Consider three faces $F_1$, $F_2$ and $F_3$ such that the matching between $F_2$ and $F_1$ and the matching between $F_2$ and $F_3$ are both curvature continuous. Despite the curvature is continuous, an abrupt curvature variation across the connecting face $F_2$ may be detected. In fact, the example implementation is able to make the difference between a thin curvature continuous connection (FIG. 27) and a wide curvature continuous connection (FIG. 28). A thin curvature continuous connection creates the said abrupt curvature variation, as opposed to a wide curvature continuous connection, which creates a soft curvature variation. In the context of mechanical drawing, edges of a thin connection (that is boundary edges of face $F_2$ in the example) may be displayed and edges of a wide connection may rather not be displayed.

Curvature of a 3D Curve

The example implementation may make use of curvature values of 3D curves. Consider a smooth curve $t \mapsto C(t)$ in 3D space. Its curvature $k(t)$ is defined by the second derivative with respect to arc length, as described for example at page 16 of the paper by M. P. do Carmo, *Differential Geometry of curves and surfaces*, Prentice-Hall, 1975. Nevertheless, it can be evaluated without explicit arc length by using the following formula, where $C'(t)$ and $C''(t)$ are respectively the first and second derivatives of $C(\bullet)$.

$$U(t) = \frac{C'(t)}{\|C'(t)\|}$$

$$V(t) = \frac{C''(t)}{\|C'(t)\|^2}$$

$$k(t) = \|\langle U(t) | V(t) \rangle U(t) - V(t)\|$$

Computing the P-Curve Direction

A parametric surface is a mapping $S:[a,b]\times[c,d] \to \mathbb{R}^3$ with notation $(u,v) \mapsto S(u,v)$. The tangent plane of surface S at point $(u,v) \in [a,b]\times[c,d]$ is the plane through point $S(u,v) \in \mathbb{R}^3$ generated by partial derivative vectors $S_u(u,v) \in \mathbb{R}^3$ and $S_v(u,v) \in \mathbb{R}^3$. By definition, a p-curve of surface S is a mapping $(\alpha,\beta):[a',b'] \to [a,b]\times[c,d]$ in the parametric space of S. Notation is $t \mapsto (\alpha(t),\beta(t))$. This p-curve defines a 3D curve through the chaining $t \mapsto S(\alpha(t),\beta(t))$.

The example implementation computes the direction of a p-curve based on a 3D vector in the tangent plane of the surface. p-curve computation is an efficient way to computer curve on a surface. Consider a point $M_0 \in \mathbb{R}^3$ on surface S and a vector $T \in \mathbb{R}^3$ in the tangent plane of surface S at $M_0$. The problem is to define a curve on surface S starting at point $M_0$ with direction T. Since $M_0$ is on S, there exists $(u_0,v_0) \in [a,b]\times[c,d]$ such that $S(u_0,v_0)=M_0$. The question is now to compute coefficients $\lambda$ and $\mu$ such that $$T = \lambda S_u(u_0,v_0) + \mu S_v(u_0,v_0)$$

This defines an over constrained linear system of two unknowns, $\lambda$ and $\mu$, and three equations. By using standard algebra, the solution is $$\Delta = \|S_u\|^2\|S_v\|^2 - \langle S_u | S_v \rangle^2$$

$$\lambda = \frac{\langle S_u | T \rangle \|S_v\|^2 - \langle S_v | T \rangle \langle S_u | S_v \rangle}{\Delta}$$

$$\mu = \frac{\langle S_v | T \rangle \|S_u\|^2 - \langle S_u | T \rangle \langle S_u | S_v \rangle}{\Delta}$$

Figure 29:
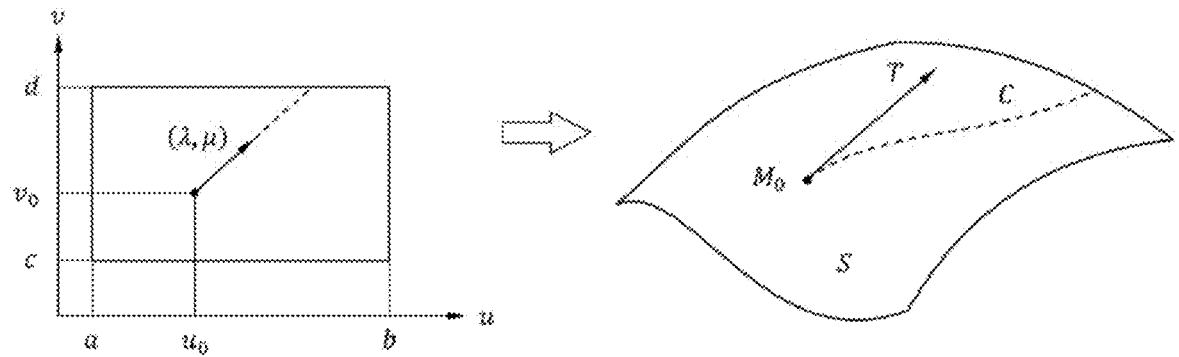

Then, the p-curve $t \mapsto (u_0+t\lambda, v_0+t\mu)$ solves the problem. Indeed, the 3D curve $t \mapsto C(t)=S(u_0+t\lambda,v_0+t\mu)$ is obviously on surface S and is such that $C(0)=S(u_0,v_0)=M_0$ and $C'(0)=\lambda S_u(u_0,v_0)+\mu S_v(u_0,v_0)=T$. This is illustrated on FIG. 29.

Selecting Visible Smooth Edges

Smooth edges selection is the key point of the example implementation.

Figure 30:
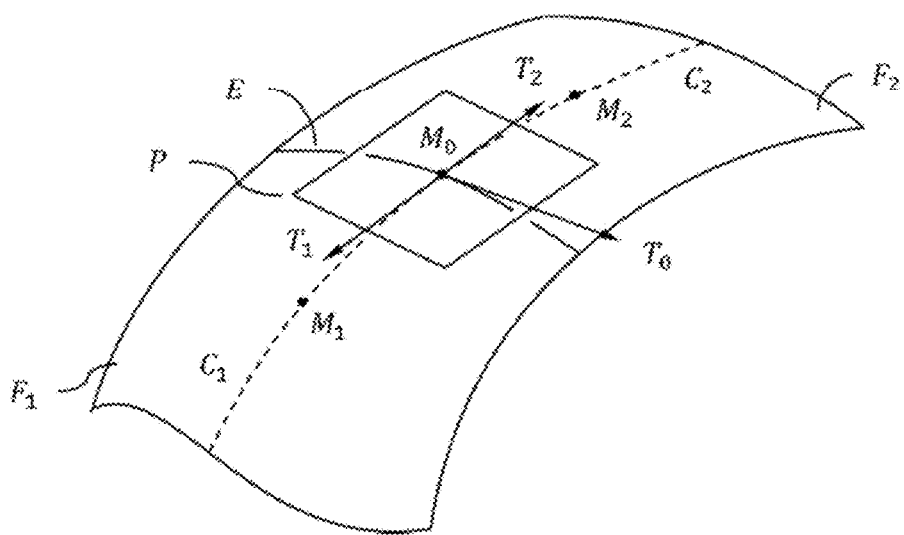

This allows to capture edges (if any) corresponding to the following visual characteristics of reflection lines:
 a reflection line tangent discontinuity,
 a reflection line curvature above a predetermined threshold, and
 a boundary of a portion including a reflection line curvature above a predetermined threshold Let E be a smooth edge of the skin model representing the mechanical part, and $F_1$, $F_2$ the adjacent faces of E. Note $M_0$ the middle point of E and P the tangent plane shared by faces $F_1$ and $F_2$ at $M_0$. Note $T_0$ the tangent vector to E at $M_0$. For $i=1,2$, note $T_i$ the direction in plane P perpendicular to $T_0$ pointing in the direction of $F_i$. Note $C_i$ the curve in face $F_i$ starting at $M_0$ in direction $T_i$. Curves $C_i$ are obtained by using the formula of previous paragraph with support surfaces of faces $F_i$. Finally, $M_i$ the middle point of curve $C_i$ for $i=1,2$. This is illustrated on FIG. 30.

The curvature of a curve C at point M is noted k(C,M). Consider now curvatures $k(C_1,M_0)$, $k(C_2,M_0)$, $k(C_1,M_1)$ and $K(C_2,M_2)$. Consider $$k_1^{max} 32 \max \{k(C_1,M_0), k(C_1,M_1)\}$$

And $$k_2^{max} = \max \{k(C_2,M_0), k(C_2,M_2)\}$$

Then, the smooth edge E is selected for visualization if $$|k_2^{max} - k_1^{max}| \geq \frac{1}{R}$$

Where $R > 0$ is a threshold radius value. This value depends on the part and may be computed as follows. Consider the respective radius values $R_i$, $i=1,\ldots,n$ of all the round and fillet surfaces of the part and set $R = \rho \max \{R_i, i=1,\ldots,n\}$. Coefficient $\rho$ is slightly larger than 1 and is used to avoid numerical instability when the curvature variation is equal to max $\{R_i, i=1, \ldots, n\}$. The typical value is $\rho \approx 1.1$. The order of magnitude is R=30 mm for stamped parts and R=3 mm for casted parts.

The predetermined threshold $$\frac{1}{R}$$

may in general correspond to me maximum radius R used in a process of manufacturing the mechanical part. For example, if the process of manufacturing the mechanical part is a stamping process, R may be a value above 10 mm and/or below 50 mm, for example of the order of 30 mm. If the process of manufacturing the mechanical part is a casting process, R may be a value above 1 mm and/or below 10 mm, for example of the order of 3 mm. This allows grasping relevant edges by integrating relevant knowledge of the manufacturing process.

By involving points $M_1$ and $M_2$ far from edge E, the method is able to select a curvature continuous smooth edge E that materialize a genuine curvature variation. As expected, the example implementation discloses the 3D shape of the part while drawing a much smaller number of edges. For example, edge E in FIG. 31 is such that $k(C_2, M_0)=k(C_2,M_2)=0$ because $C_2$ is a straight line, $$k(C_1, M_0) = k(C_1, M_1) = \frac{1}{R_0}$$

because $C_1$ is a circle with radius $R_0$. Since, visibly, $R_0 > R$, then $$|k_2^{max} - k_1^{max}| = |k_1^{max}| = \frac{1}{R_0} < \frac{1}{R}$$

meaning that edge E is not selected.

FIG. 32 illustrates all edges of a sheet metal part. FIG. 33 illustrates all boundary edges and silhouette edges. FIG. 34 illustrates all boundary and silhouette edges together with smooth edges selected by the method. Notice that superfluous edges are removed while the 3D shape remains understandable.

The invention claimed is:

1. A computer-implemented method for generating a 2D drawing representing a mechanical part, the method comprising:
    obtaining, a 3D modeled object which represents a 3D shape of the mechanical part;
    determining continuous 3D curves which each represent a respective instance of a predetermined set &visual characteristics of reflection lines defined on the 3D shape; and
    projecting the determined continuous 3D curves on a 2D plane,
    wherein the predetermined set of visual characteristics includes at least one from a set consisting of:
        an end,
        a zero-order discontinuity,
        a tangent discontinuity,
        a curvature above a predetermined threshold, and
        a boundary of a portion including a curvature above a predetermined threshold, and
    wherein the determining of continuous 3D curves comprises determining curvature continuity curves which define the boundary between two adjacent faces across which the variation of a curvature is above a predetermined threshold.

2. The method of claim 1, wherein the 3D modeled object is a B-Rep comprising edges, and
    wherein the continuous 3D curves, which represent zero-order discontinuities, tangent discontinuities, the curvatures above the predetermined threshold and/or the boundaries of portions including a curvature above the predetermined threshold are determined among the edges of the B-Rep.

3. The method of claim 1, wherein the curvature of a respective face relative to a respective boundary is a function of the curvature at one or more points of a curve of the respective face intersecting the respective boundary.

4. The method of claim 3, wherein the curve of the respective face intersecting the respective boundary intersects the respective boundary orthogonally and/or at a middle point of the respective boundary.

5. The method of claim 3, wherein the respective face is a portion a parametric surface and the curve of the respective face intersecting the respective boundary is a p-curve of the parametric surface.

6. The method of claim 3, wherein the one or points of the curve of the respective face intersecting the respective boundary include a point at which the curve of the respective face intersecting the respective boundary intersects the respective boundary and/or a middle point of the curve.

7. The method of claim 1, wherein the predetermined threshold corresponds to the maximum radius used in a process of manufacturing the mechanical part.

8. The method of claim 7, wherein the process of manufacturing the mechanical part is a stamping process and the maximum radius is a value above 10 mm and below 50 mm.

9. The method of claim 7, wherein the process of manufacturing the mechanical part is a casting process and the maximum radius is a value above 1 mm and below 10 mm.

10. The method of claim 1, wherein the mechanical part is a sheet metal part.

11. A non-transitory computer readable storage medium having recorded thereon a computer program comprising instructions for performing a computer-implemented method for generating a 2D drawing representing a mechanical part, the method comprising:
    obtaining a 3D modeled object which represents a 3D shape of the mechanical part;
    determining continuous 3D curves which each represent a respective instance of a predetermined set of visual characteristics of reflection lines defined on the 3D shape; and
    projecting the determined continuous 3D curves on a 2D plane,
    wherein the predetermined set of visual characteristics includes at least one from a set consisting of:
        an end,
        a zero-order discontinuity,
        a tangent discontinuity,
        a curvature above a predetermined threshold, and
        a boundary of a portion including a curvature above a predetermined threshold, and
    wherein the determining of continuous 3D curves comprises determining curvature continuity curves which define the boundary between two adjacent faces across which the variation of a curvature is above a predetermined, threshold.

12. The non-transitory computer readable storage medium of claim 11, wherein the 3D modeled object is a B-Rep comprising edges, and wherein the continuous 3D curves which represent zero-order discontinuities, tangent discontinuities, the curvatures above the predetermined threshold and/or the boundaries of portions including a curvature above the predetermined threshold are determined among the edges of the B-Rep.

13. A system comprising:

a processor coupled to a memory, the memory having recorded thereon a computer program comprising instructions for generating a 2D drawing representing a mechanical part, the instructions when executed by the processor causing the processing to be configured to:

obtain a 3D modeled object which represents a 3D shape of the mechanical part, determine continuous 3D curves which each represent a respective instance of a predetermined set of visual characteristics of reflection lines defined on the 3D shape, and project the determined continuous 3D curves on a 2D plane, wherein the predetermined set of visual characteristics includes at least one from a set consisting of:
an end,
a zero-order discontinuity,
a tangent discontinuity,
a curvature above a predetermined threshold, and
a boundary of a portion including a curvature above a predetermined threshold, and wherein the determining of continuous 3D curves comprises determining curvature continuity curves which define the boundary between two adjacent faces across which the variation of a curvature is above a predetermined threshold.

14. The system of claim 13, wherein the 3D modeled object is a B-Rep comprising edges, and wherein the continuous 3D curves which represent zero-order discontinuities, tangent discontinuities, the curvatures above the predetermined threshold and/or the boundaries of portions including a curvature above the predetermined threshold are determined among the edges of the B-Rep.

* * * * *